Aug. 31, 1937.   E. P. SCHREYER   2,091,528
ILLUMINATING DEVICE
Filed April 19, 1937   2 Sheets-Sheet 2
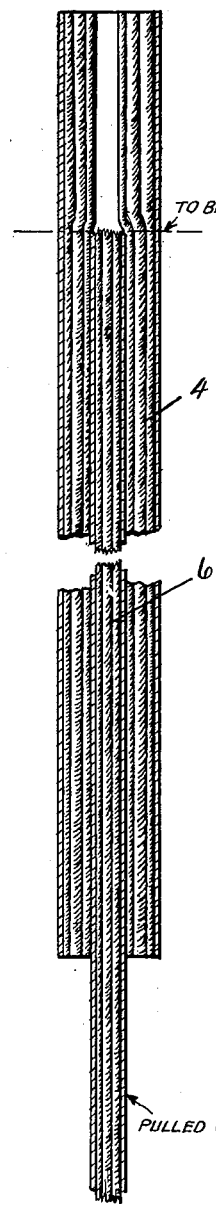
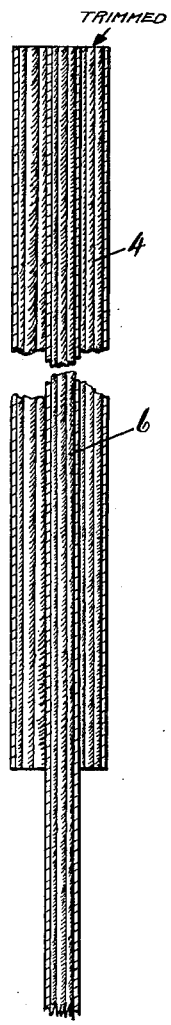
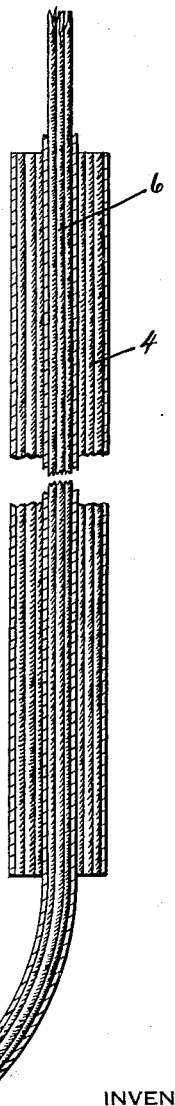
INVENTOR
Edward P. Schreyer
BY
ATTORNEYS Patented Aug. 31, 1937

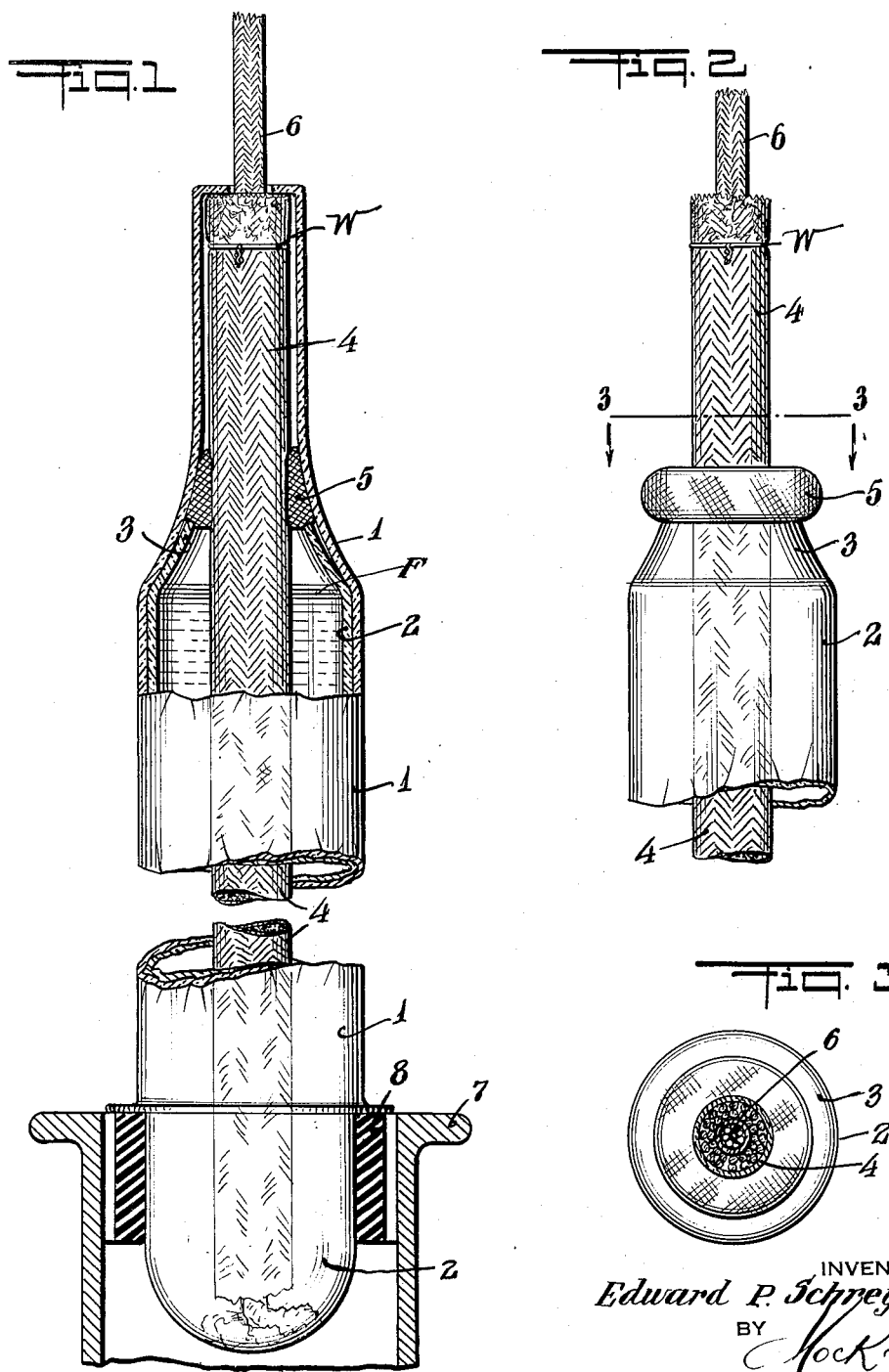

2,091,528

UNITED STATES PATENT OFFICE 2,091,528

ILLUMINATING DEVICE

Edward P. Schreyer, Brooklyn, N. Y.

Application April 19, 1937, Serial No. 137,647

6 Claims. (Cl. 67—36)

My invention relates to a new and improved candle device.

One of the objects of my invention is to provide a candle device which has a casing made of glass or metal or other suitable material, and which simulates the appearance of the ordinary wax candle, said casing having a suitable wick device.

Another object of the invention is to provide a candle device which will eliminate the principal objections arising from the use of wax candles, such as smoke, unpleasant odor, the dripping of the wax, and the bending or sagging of the wax candle.

Another object of my invention is to provide a candle having a glass casing which can be colored or ornamented so as to provide a suitable decorative effect, said casing having an improved wick device which will produce a uniform flame, which will have a long life.

Other objects of my invention will be set forth in the following description and drawings which illustrate a preferred embodiment thereof, it being understood that the above statement of the objects of my invention is intended generally to explain the same without limiting it in any manner.

Fig. 1 is a vertical central section, partially in elevation, showing the improved device.

Fig. 2 is a partial vertical elevation showing the inner casing, the wick, and the supplemental absorbent collar.

Fig. 3 is a section on the line 3—3 of Fig. 2.

Figs. 4, 5 and 6 are diagrammatic views showing one method of manufacture and assembly of the improved wick device.

It has heretofore been proposed to use candle devices having a height of more than five inches, and which utilized a combustible liquid and a wick, like an ordinary kerosene lamp. Such devices have hitherto not been successful. The flame overheated and cracked the glass casing. Likewise the wick did not operate to produce a flame of long life, if the distance from the surface of the oil or other combustible liquid, to the effective top of the wick, exceeded a rather short distance, such as about five inches.

It is one of the advantages of my improved device that I can use casings made in different heights, from ten inches to fifteen inches in height, and insure the effective combustion of all of the liquid within the casing, and I can produce a flame which will burn for at least two hours.

Likewise the improved device prevents the overheating and cracking of the glass, if this material is used for making the casing.

Referring to Fig. 1, this shows an outer casing 1 which is preferably made of glass, although said outer casing can be made of any other suitable material. If said outer casing is made of glass, said glass is preferably of the thin and heat-resistant type which is generally used for making beakers, test tubes, and the like.

The device also comprises an inner casing 2 which fits closely but not tightly within the casing 1. Said inner casing 2 can also be made of glass.

The assembly between the casings 1 and 2 is loose so that said casings are easily movable relative to each other, in their axial direction.

The bottom of the casing 2 is closed, and said casing 2 is provided with a washer 8 made of resilient rubber or other suitable material, which fits tightly on the bottom end of the casing 2. Said washer 8 also fits tightly and frictionally within the opening of a stand 7.

Fig. 1 seems to show a space between the outer wall of the washer or sleeve 8 and the inner wall of the stand 7, but this is due to the corrugated shape of the outer wall of the washer 8.

The casing 1 is open at its top and bottom and the open bottom end of the casing 1 is provided with a flange which abuts the top of the washer 8. Hence said washer 8 limits the longitudinal movement of the outer casing 1, in a direction towards the closed end of the inner casing 2.

An important feature of the invention is the improved wick construction which is shown diagrammatically in Figs. 4–6.

The wick device comprises an inner wick 6 and an outer hollow or sleeve-like wick 4. The inner wick 6 may have the well known longitudinal and highly absorbent filaments, which can exert sufficient capillary action on the fuel oil F, which is located within the inner casing 2. These longitudinal filaments are not illustrated in detail in the drawings. Said filaments have a straight-line shape when the wick 6 is held straight. These longitudinal filaments are held in position by means of an absorbent knitted or braided jacket.

Since the construction or manufacture of a braided or knitted jacket is well known per se, detailed description thereof is unnecessary. The inner wick 6 may be of any suitable type.

The outer hollow wick 4 likewise has a suitable number of said longitudinal and highly absorbent threads or filaments, which may be held in position by an outer braided or knitted jacket.

These filaments and said jackets are diagrammatically illustrated in Fig. 3 which shows that the filaments of the outer wick are arranged in a plurality of layers.

In the preferred method of manufacture of the combination wick, the inner wick is first made, according to the construction previously described.

The inner longitudinal filaments of the outer annular wick 4 are then caused to abut the jacket of the inner wick, and the jacket of the outer wick is then made in situ. The longitudinal filaments of the outer wick may be connected in any suitable manner so that the inner wick is slidable relative to the outer wick. The jackets of the inner wick and of the outer wick, or the jacket of the outer wick (if the jacket of the inner wick is omitted), constitute means for holding the inner and outer wick elements assembled, while permitting longitudinal movement of the inner wick, relative to the outer wick.

Referring to Fig. 1 these means are independent of the casing, so that the wick device forms a unit independent of the casing.

After the wick structure has thus been formed, the inner wick 6 is pulled a suitable distance out of the outer wick as illustrated in Fig. 4. This distance may be about four inches, although I do not wish to be limited to any specific figures.

As illustrated in Figs. 4 and 5, the outer wick is then trimmed so that one end of the outer wick is substantially flush with the corresponding end of the inner wick, and one end of the inner wick remains projecting from the outer wick. This result is shown in Fig. 5.

The flush end of the inner wick is then pulled a suitable short distance out of the outer wick so that one end of the inner wick projects a relatively short distance out of the outer wick, and the other end of the inner wick remains projecting a much greater distance out of the outer wick. This produces a wick device comprising assembled inner and outer elements, which may be handled and bent as a unit.

Referring to Fig. 6, the bottom projecting part of the inner wick may be trimmed flush with the corresponding end of the outer wick.

The outer wick is provided with a collar 5 which is also made of absorbent material. This collar 5 snugly abuts a substantial portion of the inner wall of the outer casing 1 and it forms a substantially liquid-tight fit between the outer wick and the inner wall of the casing 1. Likewise said washer 5 acts as a plug to seal the annular space between the jacket of wick 4 and the inner wall of the open top end of the inner casing 2.

Near its upper end the outer wick 4 may be provided with a transverse wire W made of copper or other good heat-conducting material. This serves slightly to constrict the corresponding portion of the outer wick 4, in order to serve as a guide for the sliding movement of the inner wick 6, and to prevent the upper end of the outer wick 4 from spreading outwardly.

The composite wick device is freely bendable but it has sufficient rigidity to maintain it in the upstanding position shown.

The outer wick is located wholly within the outer casing 1, and its upper end substantially abuts the inner surface of the top wall of said outer casing 1. The effective cross section of the outer wick can be made much greater than the effective cross section of the inner wick, depending upon the type of oil or other fuel F which is used.

Experience has shown that if a single wick is used, this cannot raise sufficient fuel for more than about five inches by capillary attraction, so as to product a flame having long life, irrespective of the thickness of the single wick. However, by utilizing what is in effect a thin wick which is located in the center of a much thicker wick, a flame can be secured which will burn for at least two hours.

If the exposed operative portion of the inner wick is burned or charred, the inner wick can be pulled further out of the outer wick, and without pulling with it any of the material of the outer wick, or any substantial part thereof. This prevents the plugging of the opening in the top wall of the outer casing 1, or any enlargement of the inner wick 6. If the material of the outer wick clung to the inner wick when the inner wick was pulled out of the outer wick, this would in effect enlarge the effective cross section of the inner wick, and this is undesirable.

The cross section or shape of the composite wick device may be varied as desired. The opening in the upper end of casing 1 is of sufficient diameter to permit the easy outward movement of wick 6, without permitting outward movement of wick 4.

The longitudinal absorbent filaments of the wick 4 may be interlaced and the filaments of wick 6 may also be interlaced, or they may be interwoven with filler threads, in addition to the use of jackets, and the annular outer wick may be provided with inner and outer surface jackets.

The absorbent collar 5 is an important feature of the invention. It produces heat conductive contact between the outer casing 1 and the outer wick 4 so that the wick takes up part of the heat which is imparted by the flame to the outer casing, thus minimizing the cracking of the glass wall of the outer casing. Said collar 5 may be of any desired height.

Likewise when the outer casing is heated, this tends to vaporize some of the fuel which has been absorbed by the outer wick and this vapor may pass downwardly, through the space between the inner casing 2 and the outer casing 1.

The collar 5 acts as trap to absorb said vapor. Likewise, due to various conditions, the temperature of the outer casing 1 may vary so that some of the vapor may condense upon the inner surface of the casing 1, above the top of the casing 2. The collar 5 takes up the condenser vapor. This collar 5 may be freely slidable upon the outer wick 4 or it may be an enlargement of said wick 4.

Experience has shown that if the device is tipped, the outer casing 1 can slide away from the washer 8 until said outer casing encloses the flame, so that the flame is automatically extinguished. The fire hazard resulting from the use of this device is therefore not greater than, and even less than, the fire hazard which results from the use of an ordinary candle.

In order to place more fuel oil within the inner casing, it is merely necessary to slide the outer casing 1 upwardly until it clears the open end of the inner casing 2. The collar 5 can then be slid upwardly, and more fuel oil can be poured into the inner casing 2, without removing the wick, since there is sufficient space between the wick and the inner surface of the open top end of the inner casing.

For the purpose of defining the collar 5 in the claims, said collar 5 may be designated as being a portion of the wick device.

I have shown a preferred embodiment of my invention, but it is clear that numerous changes and omissions can be made without departing from its spirit.

I claim:

1. An illuminating device comprising an outer casing having an opening in its top wall, an inner casing located within said outer casing and adapted to hold a combustible liquid, said inner casing being open at its upper end, the upper end of the inner casing being below the top of the outer casing, absorbent material located in said inner casing and extending upwardly from said inner casing and having a portion thereof fitting snugly against the inner wall of the top portion of the outer casing and below the top edge of the top opening of the outer casing, and a wick device projecting from said opening of the outer casing, said wick device extending below and being in liquid-transferring contact with said absorbent material.

2. An illuminating device comprising an outer casing which is open at its top and bottom, an inner casing located within said outer casing and adapted to hold a combustible liquid, the inner casing being open at its top end, the top end of the inner casing being below the top of the outer casing, the outer casing being slidable relative to the inner casing, absorbent means located in said inner casing and extending upwardly from said inner casing, an absorbent collar located on said absorbent means and slidable on said absorbent means, said absorbent collar having an inner surface which abuts a portion of said absorbent means and having an outer surface which abuts a portion of the inner surface of the outer casing above the top of the inner casing, said absorbent means having a portion thereof projecting above the top of the outer casing.

3. An illuminating device comprising a casing adapted to hold liquid fuel and provided with an opening in the top thereof, a wick located in said casing and projecting outwardly through said opening, a member loosely located about the projecting portion of said wick and telescoping a portion of the casing, an extension carried by said wick and extending above said member, and an annulus about said wick and engaging the top of said casing to close the opening therein and snugly engaging within said member.

4. An illuminating device comprising a casing adapted to hold liquid fuel and provided with an opening in the top thereof, a wick located in said casing and projecting outwardly through said opening, a member located about and extending above said opening in said top, and means engaging about the projecting portion of said wick and snugly engaging within said member to support said wick in said casing, said means also engaging the top of the casing and providing a seal between the top of said casing and said member.

5. An illuminating device comprising a casing adapted to hold liquid fuel and provided with a relatively large opening in the top thereof, a wick located in said casing and projecting outwardly through said opening, the diameter of said wick being of such a size relative to said opening that liquid fuel may be poured into said casing between the exterior surface of said wick and the edge of said opening, a member loosely located about the projecting portion of said wick and telescoping a portion of the casing, said member having a top wall abutting the top of said wick, said top wall having an axial opening, an extension carried by said wick extending upwardly through said axial opening in said top wall, and a combined stop and wick supporting member engaging about said wick and snugly engaging within said member, said supporting member engaging against the top of said casing whereby to close the space between the wick and the edge of the opening in the top of the casing.

6. An illuminating device comprising a casing adapted to hold liquid fuel and provided with an opening in the top thereof, an outer wick member located in said casing and projecting outwardly through said opening, a member loosely located about the projecting portion of said wick and telescoping a portion of the casing, an inner wick member within said outer wick member and projecting above the upper end thereof and above said member, and absorbent means engaging about the projecting portion of said outer wick member and snugly engaging within said first named member at a point spaced downwardly of said top wall.

EDWARD P. SCHREYER.